Oct. 2, 1928.
F. F. HILLIX
1,686,324
ELECTRIC MOTOR
Filed Nov. 25, 1922
2 Sheets-Sheet 1
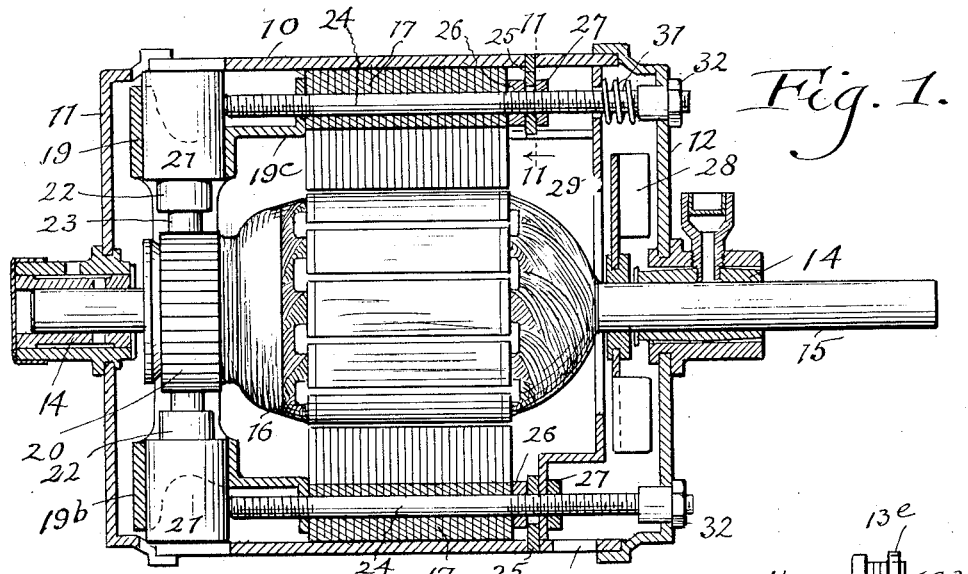
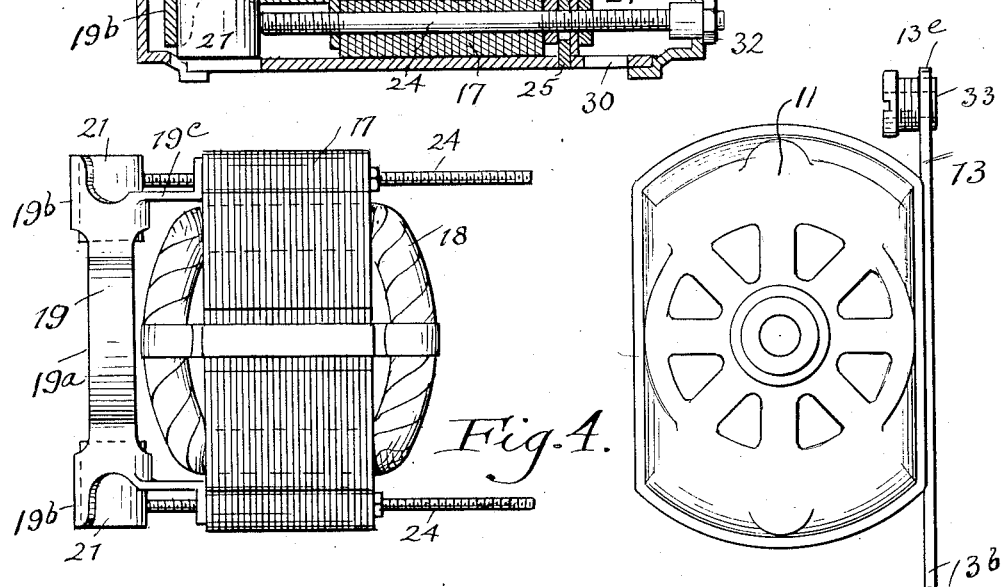
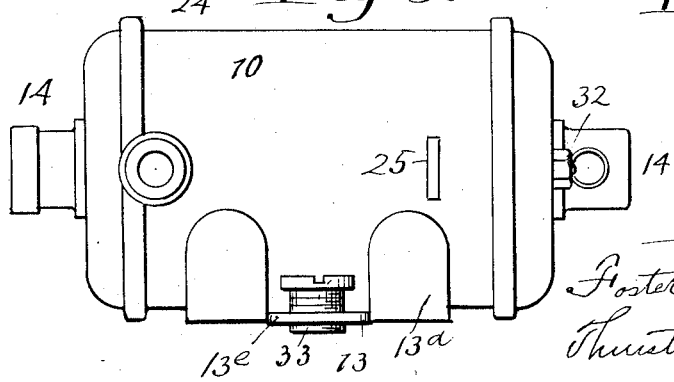

Oct. 2, 1928.
F. F. HILLIX
ELECTRIC MOTOR
Filed Nov. 25, 1922
1,686,324
2 Sheets-Sheet 2
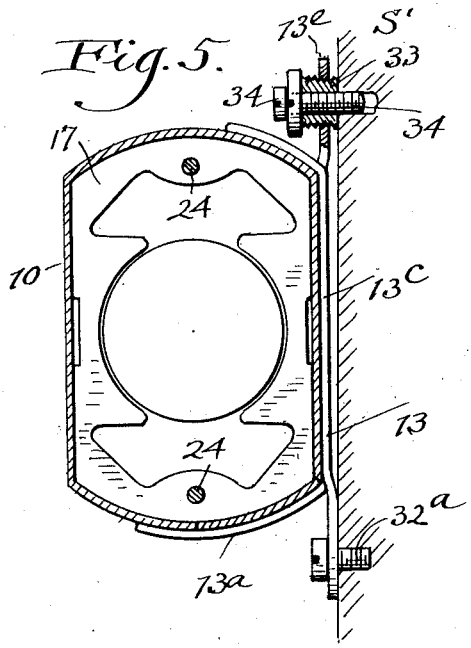
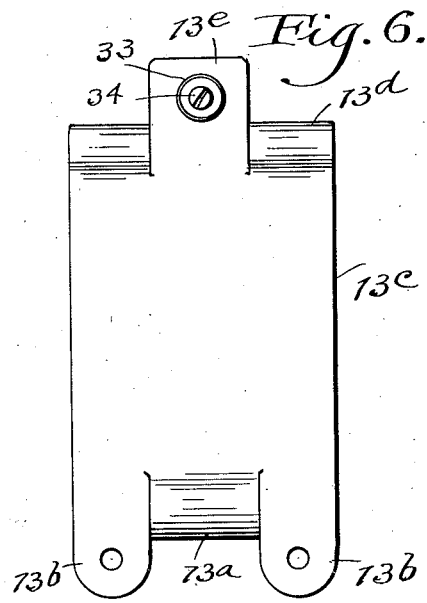
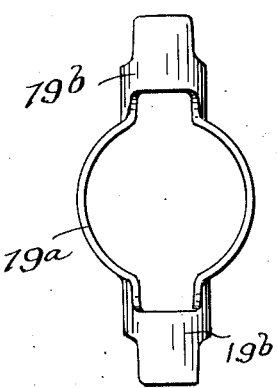
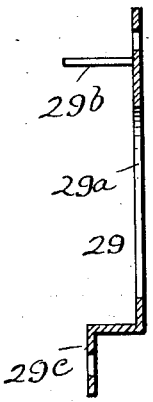
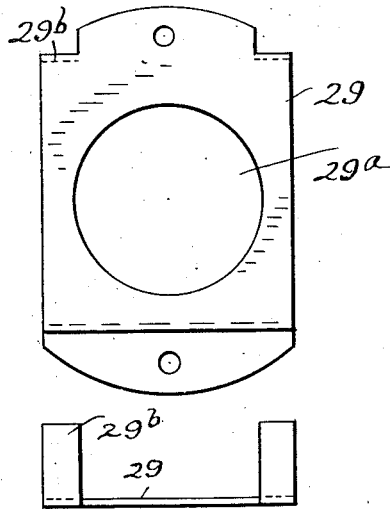
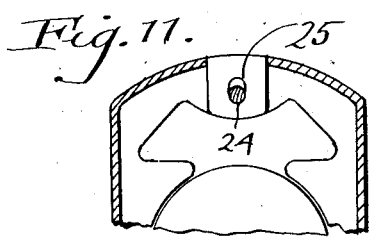

Patented Oct. 2, 1928.

1,686,324

UNITED STATES PATENT OFFICE.

FOSTER F. HILLIX, OF CLEVELAND, OHIO, ASSIGNOR, BY MESNE ASSIGNMENTS, TO WHITE SEWING MACHINE CORPORATION, OF CLEVELAND, OHIO, A CORPORATION OF DELAWARE.

ELECTRIC MOTOR.

Application filed November 25, 1922. Serial No. 603,264.

This invention relates to improvements in electric motors and has for its chief object to provide a construction embodying to a high degree the features of efficiency and compactness. Further the invention aims to provide a motor which can be produced inexpensively, sheet metal parts being utilized to a large extent, which can be readily and cheaply produced and easily assembled.

It is the particular aim of this invention to provide a construction adaptable for small motors such as are utilized in driving sewing machines and other small machines, but particularly the former. In adapting my invention for sewing machine motors it is one of the specific objects to provide a motor of such small size and of such shape that it can be attached to the arm of a sewing machine head in driving relation to the hand wheel of the machine without the necessity of sifting the motor to place a cover over the machine or to swing the head downward into a sewing machine cabinet if the motor is utilized on sewing machines of the drop head type. In other words, it is one of the objects to provide a motor which will project laterally the least possible distance from the support to which it is attached.

The invention may be briefly summarized as consisting in certain novel details of construction, and combinations and arrangements of parts which will be described in the specification and set forth in the appended claims.

In the accompanying sheets of drawings, Fig. 1 is a vertical sectional view of a motor embodying my invention in its preferred form; Fig. 2 is an end view of the same showing one form of supporting bracket; Fig. 3 is a top plan view of the same; Fig. 4 is a view of the field and brush holder unit removed from the casing; Fig. 5 is a transverse sectional view through the casing, field member and supporting bracket; Fig. 6 is a view of the bracket and casing looking toward the left of Fig. 5; Fig. 7 is a front view of the brush holder; Fig. 8 is a sectional view through a deflector which is provided in the casing to obtain the desired air circulation; Fig. 9 is a face view of the same; Fig. 10 is an end view of the same; and Fig. 11 is a detail sectional view substantially along the line 11—11 of Fig. 1 looking in the direction indicated by the arrows.

My improved motor includes a casing having a main or body portion 10, and two end housings 11 and 12, preferably telescopically fitted onto the ends of the body portion 10. It will be observed that the motor is substantially oblong in shape, having slightly rounded top and bottom portions and flat parallel sides which reduce as much as possible its lateral dimension, so that when attached to a machine to be driven, such as the head of a sewing machine, by a supporting bracket such as shown at 13, it will project laterally from the support S' a very short distance, thus adapting the motor for use on sewing machines of the portable or drop head types.

The three parts of the casing are preferably formed of sheet metal, each being a separate stamping. The end member or housing 11 is preferably permanently fixed to the end of the body member 10 by suitable means such as by spot welding, but the opposite end housing is preferably removably attached as will be hereinafter explained.

The body member 10 is formed from a strip of metal whose ends are brought together at the middle of the bottom of the casing as best shown in Fig. 5, and they are held together by a lower extension 13$^a$ of the bracket 13 which is secured to both ends preferably by spot welding, one operation securing the bracket to the body portion 10 of the casing, and closing together the ends of the strip forming the latter. This feature materially reduces the cost of constructing the casing part of the motor.

The end housings 11 and 12 are provided with bearings 14, preferably of the self aligning type, in which is journaled the shaft 15 of the armature 16. The armature per se forms no part of the present invention, and the details thereof need not be further referred to.

The field and brush holder rigging are preferably formed in one unit and applied as a unit to the interior of the casing, this unit being shown detached in Fig. 4. The field member comprises an elongated body 17 of laminæ provided with suitable field coils 18 a bi-polar machine being herein illustrated as will be seen by reference to Fig. 5.

Attached to one end of the field member 17 is a brush holder 19 which is preferably formed from one piece of sheet metal having an annular part 19$^a$ (see Fig. 7), which is adapted to surround the commutator 20 and having a pair of diametrically opposed cylindrical portions 19$^b$ adapted to receive fibre or other insulating bushings 21 in which are secured metal holders 22 which accommodate the brushes 23. The cylindrical portions 19$^b$ have axially disposed extensions 19$^c$ provided with outwardly bent inner ends which bear against the adjacent laminated field member 17 and hold the brush holder 19 a fixed distance from and in fixed relation with respect to the field member.

The field member 17 and brush holder 19 are secured together, and the unit thus formed is held in proper position in the motor casing by a pair of small stud bolts 24 which pass axially entirely through the laminated member 17 and project on both sides thereof. At the brush holder side they pass through the feet at the inner ends of the extensions 19$^c$ of the brush holder, being threaded in them so as to secure the brush holder to the field member. The screws 24 extend through the threaded openings in these extensions 19$^c$ and the ends bear against the insulating bushings 21 thus serving at the same time to secure these bushings 21 in the cylindrical portions 19$^b$ of the brush holder.

In assembling the parts of the motor the end housing 11 is secured to the body member 10 of the casing, and the field and brush holder unit are then slipped into place from the open end which is subsequently closed by the removable housing 12. The field member fits friction tight in the body portion 10 of the casing but is preferably held in fixed position therein by a pair of lugs or washers 25 whose outer ends are seated in slots in the casing and through which the stud bolts 24 pass. Preferably these washers are provided with elongated openings, best shown in Fig. 11, so that the washers can be slipped along the stud bolts from their outer ends to proper position and then may be lifted outwardly so that their outer ends will be seated in the slots of the casing. Nuts 26 are here shown on the stud bolts between the field member 17 and the lugs 25, and nuts 27 may be screwed along the stud bolts so as to bear against the outer faces of the lugs, but this is not necessary for both the top and bottom of the motor.

For the purpose of cooling the motor, the armature shaft 15 is provided with a fan 28, and in order that the air currents may be properly directed through the motor from one end to the other around the armature, there is fitted inside the casing just inwardly of the fan 28, a deflector 29, the details of which are shown in Figs. 8, 9 and 10. This deflector has a central opening 29$^a$ preferably slightly larger than the armature, but otherwise closes the space inside of the casing. This deflector serves to prevent the fan creating simply local currents in the casing, but causes the air to pass through perforations in the end housing 11 through the housing past the armature, through the central opening 29$^a$ of the deflector, and out through an opening or slot 30 in the bottom of the body portion of the motor between the lower portion of the deflector and the end housing with a tangential discharge. This deflector which is preferably a sheet metal stamping, is provided at the top or upper corners with laterally projecting feed 29$^b$ which bear against the upper part of the laminated field member 17, and the lower part 29$^c$ is offset inwardly as shown, this offset bearing against the lower lug 25. The deflector is offset as stated to make room for the outlet slot 30. This arrangement, particularly when a centrifugal fan is used, as shown, produces a very effective cooling action and causes the motor to be very silent in action. The cooling effect obtained allows a considerably increased load output over what would be obtained by the addition of an ordinary fan in a motor of usual construction and this I find is due to the particular arrangement of parts here employed. For example, by having the air intake openings in the end housing adjacent the commutator, and by employing a brush holder as shown, with a part encircling the commutator close to the end turns of the field coils, and using a deflector with its central opening and a fan between it and the adjacent end housing together with an outlet opening in the bottom of the casing as described, the air is sucked into the communtator end and is deflected inwardly by the brush holder onto the commutator and then passes along the surface of the armature and then out through the bottom of the casing at the opposite end so that a maximum cooling effect and quiet running are both obtained.

The stud bolts 24 pass through openings in the deflector, which may, if desired, be held in place by nuts screwed onto the bolts up against the outer side of the deflector, but in this instance the deflector is held against the field member at the top by a coil spring 31 between the end housing 12 and the deflector, as the spring saves time in assembling.

The stud bolts pass through openings in the end housing 12, and the latter is secured in place by nuts 32 screwed onto the ends of the bolts.

In assembling the parts of the motor the end housing 11 is slipped onto the end of the body portion 10 of the casing and is suitably secured thereto as by spot welding, the ends of the sheet metal strip, forming the body 10 being secured together preferably by the lower portion of the bracket 13 as by spot welding.

The field and brush holder parts having been secured together in the form of a unit shown in Fig. 4 are then slipped into the open end of the casing, and the lugs 25 are applied in the manner explained to hold the unit in the desired position in the casing. The armature 16 and deflector 29 can then be slipped into place after which the open end of the casing is closed by the housing member 12 which is secured in place by the nuts 32.

Inasmuch as many of the parts are formed of sheet metal, such as the laminæ of the field 17, the brush holder 19, lugs 25, deflector 29, fan 28 and the three parts 10, 11 and 12 of the casing, as well as the bracket 13, these parts can be formed inexpensively, and the design is such that the parts can be expeditiously assembled particularly by reason of the fact that the feld and brush holder parts can be assembled into a unit and completely wired and slipped into place at one time.

As before stated, this motor is designed particularly for use on sewing machine heads of the electrically driven type, and particularly for portable and drop head sewing machines where economy in space, particularly rearwardly of the head where the motor is ordinarily located is important. Though my improved motor is not limited to any particular form of drive, friction drive is contemplated and may be used very advantageously by providing the shaft with a small friction driving pulley for engagement with the hand wheel of the sewing machine. In such event an adjustment in the mounting is desirable to compensate for wear and so that the pulley can be maintained in yielding driving engagement with the hand wheel. The bracket 13, here shown, is admirably adapted for that purpose, this bracket having a pair of downwardly projecting tongues 13$^b$ which are located on opposite sides of the lower tongue 13$^a$ which is spot welded to the bottom of the casing and secures the ends of the body member together as already explained. These tongues 13$^b$ may with the present bracket be permanently or non-adjustably secured by screws 32$^a$ to the sewing machine head or other support. This bracket is further provided with a body portion 13$^c$ which extends along the back of the motor and at the top with a pair of tongues 13$^d$ which extend for a distance over the top of the motor, the portions 13$^c$ and 13$^d$ being likewise preferably spot welded to the motor casing. Additionally the bracket is provided at the top between the tongues 13$^d$ with an upstanding tongue 13$^e$ which is adjustably secured to the motor support S'. The securing means for the top consists in this instance of two screws, one extending through the other and including an outer screw 33 threaded in the tongue 13$^e$ and bearing against the face of the support S', and an inner screw 34 which passes through the bore of the screw 33 and is threaded into the support S'. By backing away the screw 34 and adjusting the screw 33 and again tightening the screw 34, the motor can be held in fixed position with reference to the support, but at slightly varying distances from the support, the bracket having sufficient flexibility to permit this adjustment. In this manner the friction driving wheel, if the motor is provided with such, can be positioned properly at any time with respect to the wheel which it frictionally engages.

While I have shown the preferred construction, I do not desire to be confined to the exact details shown, but aim in my claims to cover all modifications which do not involve a departure from the spirit and scope of my invention as defined in the appended claims.

Having described my invention, I claim:

1. An electric motor comprising a casing, field and armature elements enclosed thereby, a supporting bracket for the motor, said casing including a body portion consisting of a member extending about the field element and having its ends secured together by said bracket.

2. In an electric motor, a casing, field and armature elements enclosed thereby, a supporting bracket for the motor, said casing including a body portion consisting of a member enveloping the field element and having its ends brought together and both secured to said bracket.

3. In an electric motor, a casing, field and armature elements enclosed thereby, a supporting bracket for the motor, said casing including a body portion consisting of a member enveloping the field element and having its ends brought together and both secured to said bracket on the under side of the motor.

4. In an electric motor, a casing, field, armature and brush holder elements enclosed thereby, the field element comprising a core, the brush holder element comprising a part having portions adapted to support brushes, and means extending axially through the core and engaging said brush holder part for securing the same thereto.

5. In an electric motor, a casing, field, armature and brush holder elements enclosed thereby, the field element comprising a core, the brush holder element having brush receiving portions, insulating sleeves in said portions, and common means for attaching said brush holder element to the core and for securing in place said insulating sleeves.

6. In an electric motor, a casing, field, armature and brush holder elements within the casing, the field element comprising a laminated core and the brush holder element comprising a brush carrying member extending about the axis of the armature and having brush receiving portions, and stud bolts extending through the core and serving to secure the brush holder member to the latter.

7. In an electric motor, a casing, field, armature and brush holder elements within the casing, the field element comprising a laminated core, the brush holder element extending about the axis of the armature and having brush receiving portions, insulating sleeves therein, and stud bolts extending axially through the core and serving to secure the brush holder element to the core and for fastening said sleeves to said element.

8. In an electric motor, a casing, field, armature and brush holder elements within the casing, the casing having slots, lugs seated in said slots and projecting inwardly therefrom, and axially disposed members extending between the core of the field element and said lugs.

9. In an electric motor, a casing comprising a body portion and an end housing, field, armature and brush holder elements within the casing, the field element comprising a core, and axially extending bolts passing through the core and projecting from both sides thereof and serving to secure the brush holder element to the core and the end housing to the body portion of the casing.

10. In an electric motor, a casing comprising a body portion and an end housing, a field core within the casing, an armature within the casing having a fan, a deflector between the core and the end housing for controlling the passage of air currents, and means for fastening the parts together comprising bolts projecting axially from the core through said deflector and through the end housing.

11. In a motor, a casing comprising a body member and end housing, field and armature elements enclosed therein, a deflector in the form of a transverse partition located between the armature and one end of the casing, a fan between the deflector and said casing end, the deflector having an opening opposite the armature, and the casing having in the body member thereof an air outlet opening through which air is ejected, one end of the deflector being offset inwardly to provide space for said opening.

12. In combination in a motor of the commutator type, a casing, field and armature elements therein, the end of the casing at the commutator end thereof having air inlet openings, a brush holder adjacent said end of the casing having a part encircling the commutator, a fan adjacent the other end of the casing, a deflector between said fan and the armature and provided with an opening in line with the armature, the fan compartment formed by the deflector and the adjacent end of the casing having an air outlet opening through which air is ejected by the fan.

In testimony whereof, I hereunto affix my signature.

FOSTER F. HILLIX.